United States Patent [19]
Bailey

[11] Patent Number: 5,264,123
[45] Date of Patent: Nov. 23, 1993

[54] ACID RECYCLING SYSTEM

[76] Inventor: Daniel E. Bailey, 20 Wilbraham St., Palmer, Mass. 01069

[21] Appl. No.: 931,945

[22] Filed: Aug. 18, 1992

[51] Int. Cl.⁵ .................. B01D 61/28; B01D 63/08
[52] U.S. Cl. .................... 210/321.75; 210/321.84
[58] Field of Search .............. 204/182.4; 210/638, 210/224, 227–231, 321.6, 321.64, 321.75, 321.85, 321.84, 321.76

[56] References Cited

U.S. PATENT DOCUMENTS

3,673,068  6/1972  Seko et al. .................. 204/182.4

Primary Examiner—Frank Sever
Attorney, Agent, or Firm—Blodgett & Blodgett

[57] ABSTRACT

A system for removing acid from a metal-rich acid stream by diffusion dialysis. The acid stream is contacted with a water stream through an ion exchange membrane, in a series, counter-current flow contactor. The contactor is formed of a stack of layers of ion exchange membranes and impervious separators with flow-control apertures. The stack includes switch-back spacers which cause the flow to switch direction.

1 Claim, 7 Drawing Sheets

GASKET CORE

WATER CELL CORE

Fig.5

ACID CELL CORE

Fig.6 BOTTOM PVC ENDPLATE

Fig.7 TOP PVC ENDPLATE

SWITCH BACK SPACER

Fig.10

ACID RECYCLING SYSTEM

BACKGROUND

The Diffusion Dialysis design that is described in detail herein, is used for the processing of acid solutions for the purpose of purifying the acid solutions, providing for the continuous recovery and reuse of the acid.

The principles and processes of Diffusion Dialysis dates back over several decades and operational systems have been in the field for at least 15-20 years. Diffusion Dialysis is a membrane separation process. Diffusion is a process in which a solute moves from an area of high concentration to an area of low concentration by virtue of the thermal energy of the system. Dialysis is a phenomenon in which a solute in solution permeates through a diaphragm. Solutes can be separated from each other by the differences in their diffusivity. The membrane acts as a diaphragm through which a solute at a high concentration will diffuse into a similar solvent containing lower concentrations of that solute. In practice, acid is the solute that diffuses through the membrane into water, the solvent. Diffusion Dialysis effects a migration, not an exchange, of anions and associated hydrogen ions, from an acid solution into water, based upon the concentration differences.

Anion exchange membranes are utilized in systems designed for the recovery of mineral acids from an acid/salt environment. Typically, the membranes are co-polymers of polystyrene and divinylbenzene and appear as thin sheets of wet, filmy plastic. Other polymers, co-polymers, and chemical compositions such as polyethylene may also be used. The membranes have been chemically prepared to possess anion exchange functionality. They also exhibit a strong affinity for acid absorption with no affinity for salt absorption.

The law of electroneutrality requires that ionic charge neutrality is maintained on both sides of the exchange membrane. To satisfy this law, either anions need to exchange through the membrane at an equal rate in both directions, or each anion that diffuses must be accompanied by an associated cation. Due to the extremely small physical size of the hydrogen ion, it is easily able to migrate through the perm-selective membrane in conjunction with an anion such as chloride, fluoride, nitrate, phosphate, or sulfate. The comparatively large metal ions are inhibited from associating with the diffusing anions; however, "leakage" of metal ions does occur.

The rate of metal "leakage" and the rate of acid recovery are functions of solution-membrane contact time. A balance is sought which maximizes the percent recovery of acid and minimizes the percent "leakage" of metal ions. Given the fixed membrane area in a dialysis stack, the recovery equilibrium is controlled by the solution flow rates.

COUNTER-CURRENT FLOW

Figure 1:
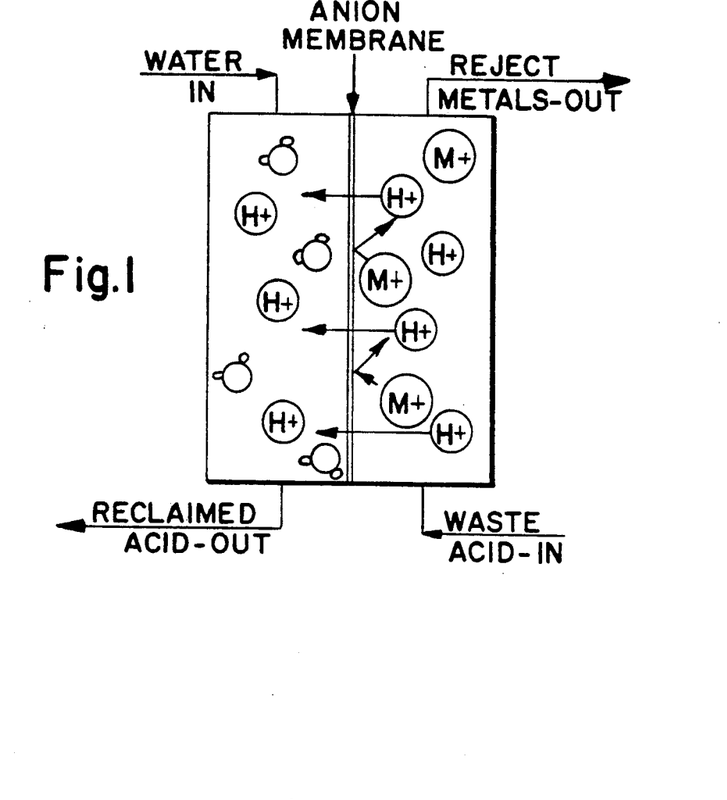
FIG. 1 shows a system providing vertical, parallel counter-flow.

In the past, Diffusion Dialysis systems relied on vertical, parallel counter-current flow as illustrated in the diagram of a single cell-pair, above (see FIG. #1). Since the driving force of Diffusion Dialysis is the concentration gradient present across an anion-exchange membrane, counter-current flow is employed to maximize the gradient potential. Upon entering the cell, fresh water comes in contact with the membrane area which has the lowest concentration of acid molecules on its other side, as this acid has been depleted by diffusion while flowing through the acid compartment (cell) and is now exiting the cell. Although this exiting acid solution may be very much depleted in acid molecules, there is still a driving force to diffuse as the water on the other side of the membrane is fresh and acid free at this point. As the water flows from the top of its cell to the bottom of its cell, where it will exit, the acid solution flows from the bottom of its cell to the top of its cell where it will exit. Thus counter-current flow is defined.

Parallel Counter-Current Flow Vs. Series Counter-Current Flow

Vertical, parallel counter-current flow utilizes a variable number of identical water flow cells matched with an equal number of acid flow cells, with solutions flowing simultaneously, unidirectionally, in all like cells. All acid flow cells share a common inlet and a common outlet, and similarly, all water flow cells share a common inlet and a common outlet. Thus parallel flow.

The efficiency of any counter-current Diffussion Dialysis process depends upon the contact time of a unit volume of solution with the anion exchange membrane. Three variables which determine the contact time per unit volume are: solution flow rate, length of membrane along the flow direction, and flow cell cross-sectional area. In a parallel flow counter-curent design, the membrane length is by the length of the flow cells. Therefore, the efficiency of the parallel flow counter-current design is inherently limited.

Figure 2:
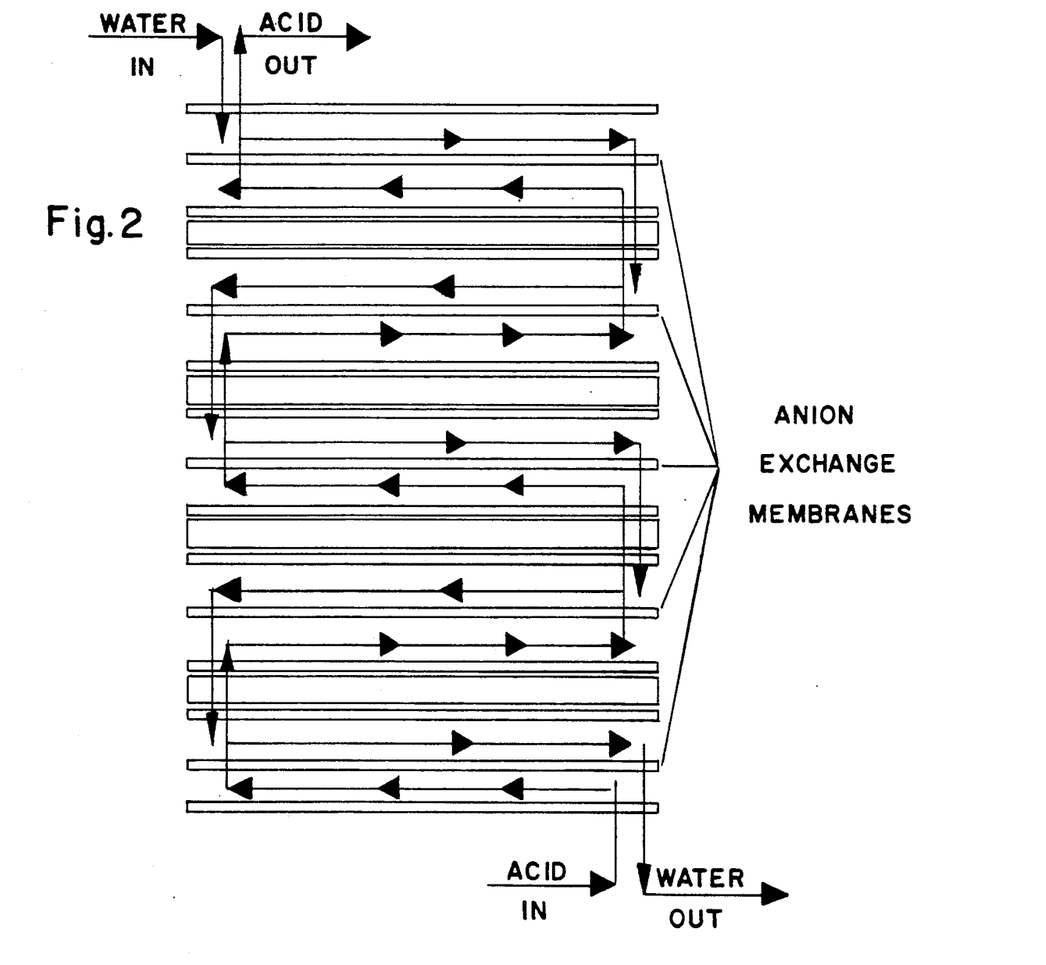
FIG. 2 shows a system providing series counter-current flow.

Series counter-current flow was conceptualized as a performance enhancement over standard parallel counter-current flow design as it provides for virtually limitless membrane length (see FIG. #2).

The series counter-current flow design utilizes horizontal solution flow cells, stacked vertically and plumbed in series. This design establishes one inlet and one outlet for each solution. Inlets and outlets are not common to all similar flow cells. Instead, flow is interconnected within the membrane stack. Thus, in the series flow design, as the solution exits one cell it is routed into an adjoining cell where it is redirected 180 degrees back across yet another new membrane. In a parallel flow design, when the solution exits the cell it exits the stack. Thus, a series counter-current membrane stack of similar dimensions to a parallel counter-current membrane stack can possess thousands of times the effective membrane length. This assures that a maximum Diffusion of acid molecules into the water solution is obtained.

Component Design

Fundamental to the mechanics of design is the Flow Cell or Cell. This cell design is composed of a total of 9 pieces grouped into 4 categories:

| Category | Quantity | Identification |
|---|---|---|
| #1 | 1 | Cell Core - 0.060" +/− 0.005" High Density Polyethylene. Outer dimensions: 155.5" × 25" typical. Dependent on the Cell identity, this will be either water flow configured or acid flow configured. |
| #2 | 2 | Gasket Core - 0.030" +/− 0.005" High Density Polyethylene. Outer dimensions: 15.5" × 25" typical. |
| #3 | 4 | Foam Gasket - 0.020" +/− 0.005" Polyethylene Foam with Pressure Sensitive Adhesive (PSA) on one side. Two configured identically to the gasket core design. Two configured identically to the particular cell core design. |
| #4 | 2 | Mixer-Support Screens - 0.075" +/− 0.005" Ethylene Vinyl Acetate (EVA). Outer Dimensions: 12" × 18" typical. |

Figure 3:
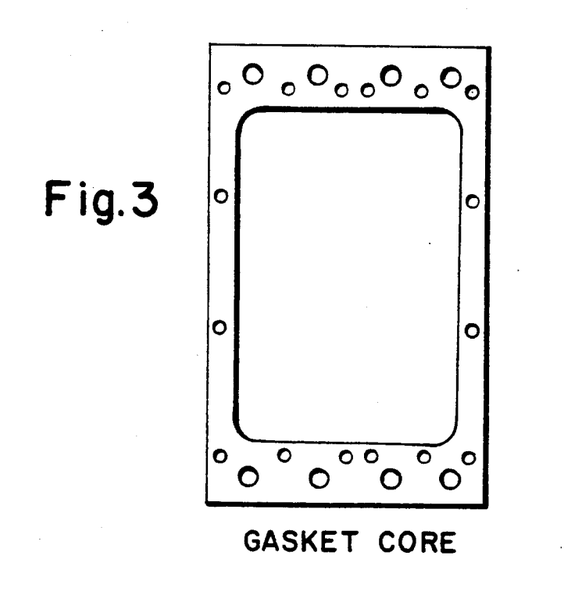
FIG. 3 shows the "Water Cell Design".

On the following pages are drawings representing the 3 fundamental designs of the flow cell: the "Gasket Core Design", the "Water Cell Design", and the "Acid Cell Design". The following sequence of events is followed when constructing a "Water Cell":

Using the "Water Cell Design" (see FIG. #3), a water cell core cut from a 0.060" sheet of High Density Polyethylene.

Figure 4:
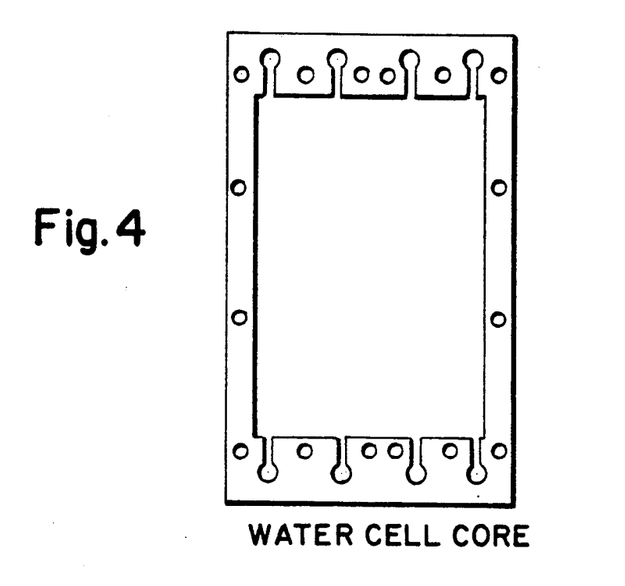
FIG. 4 shows the "Gasket Core Design".

Using the "Gasket Core Design" (see FIG. #4), two gasket cores are cut from a 0.030" sheet of High Density Polyethylene.

Using the "Water Cell Design", two polyethylene foam gaskets are cut from 0.020" Polyethylene foam backed with pressure sensitive adhesive (PSA).

Using the "Gasket Core Design", two polyethylene foam gaskets are cut from 0.020" Polyethylene foam backed with pressure sensitive adhesive (PSA).

A "Water Cell Gasket" is assembled by adhering the polyethylene foam gaskets to each side of a 0.030" HDPE "Gasket Core". One of the polyethylene foam gaskets must be of the "Gasket Core" design, and one must be of the "Water Cell" design. Two "Water Cell Gaskets" must be assembled for every "Water Cell Core" and there is one water cell core for every cell pair.

A "Water Flow Cell" is assembled by placing a "Water Cell Gasket" on either side of a "Water Cell Core", oriented so that the polyethylene foam of the "Water Cell" design is immediately adjacent to the "Water Cell Core". These are held together by a clamping mechanism when all the cells are assembled into a stack.

Figure 5:
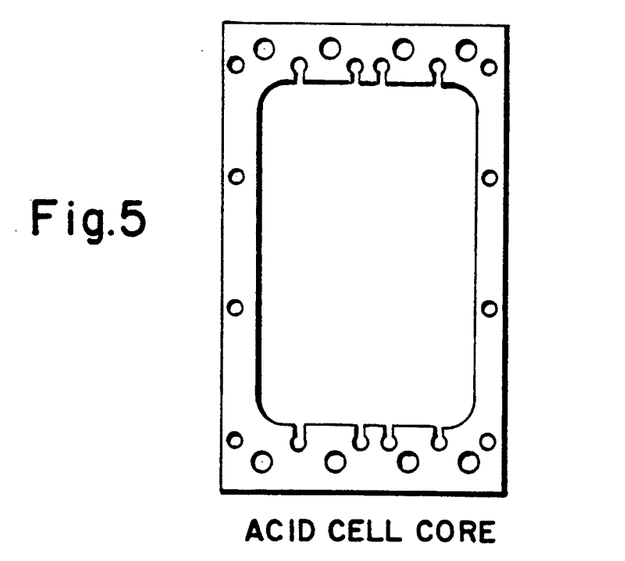
FIG. 5 shows the "Acid Cell Design".

The following sequence of events is followed when constructing an "Acid Cell";

Using the "Acid Cell Design" (see FIG. #5), an acid cell core is cut from a 0.060" sheet of High Density Polyethylene.

Using the "Gasket Core Design", two gasket cores are cut from a 0.030" sheet of High Density Polyethylene.

Using the "Acid Cell Design", two polyethylene foam gaskets are cut from 0.020" Polyethylene foam backed with pressure sensitive adhesive (PSA).

Using the "Gasket Core Design", two polyethylene foam gaskets are cut from 0.020" Polyethylene foam backed with pressure sensitive adhesive (PSA).

An "Acid Cell Gasket" is assembled by adhering the polyethylene foam gaskets to each side of a 0.030" HDPE "Gasket Core". One of the polyethylene foam gaskets must be of the "Gasket Core" design, and one must be of the "Acid Cell" design. Two "Acid Cell Gaskets" must be assembled for every "Acid Cell Core" and there is one "Acid Cell Core" for every cell pair.

An "Acid Flow Cell" is assembled by placing an "Acid Cell Gasket" on either side of an "Acid Cell Core", oriented so that the polyethylene foam of the "Acid Cell" design is immediately adjacent to the "Acid Cell Core". These are held together by a clamping mechanism when all the cells are assembled into a stack.

Once the "Water Flow Cell" or the "Acid Flow Cell" has been assembled, two Ethylene Vinyl Acetate "Mixer/Support Screens" are positioned in the main open area of each Flow Cell. This step is done during the assembly process.

Stack Assembly

Figure 6:
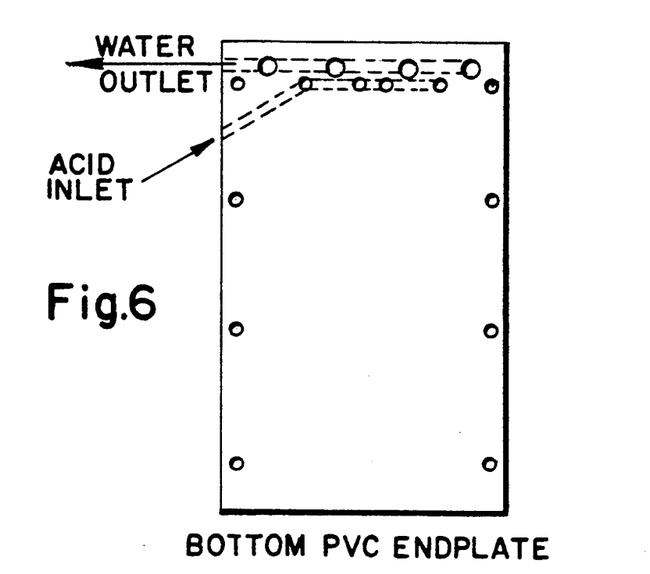
FIGS. 6 and 7 show two stack end-plates which facilitate the beginning of manufacture.
Figure 7:
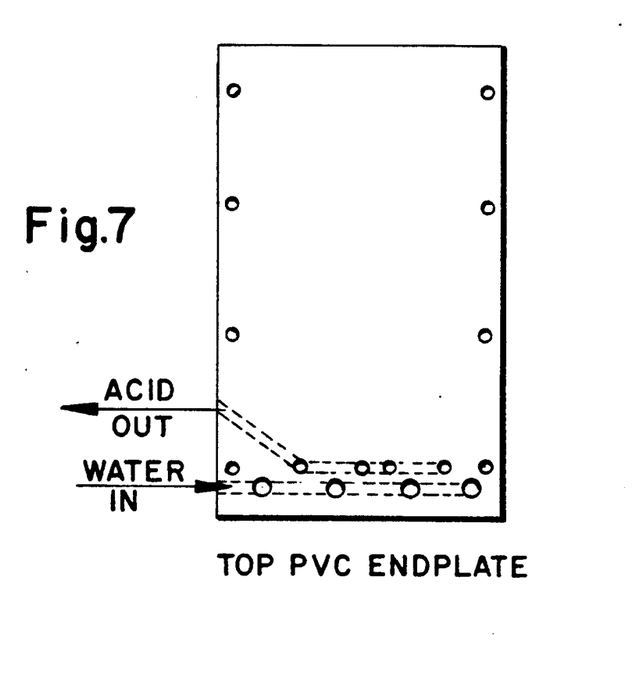
Figure 8:
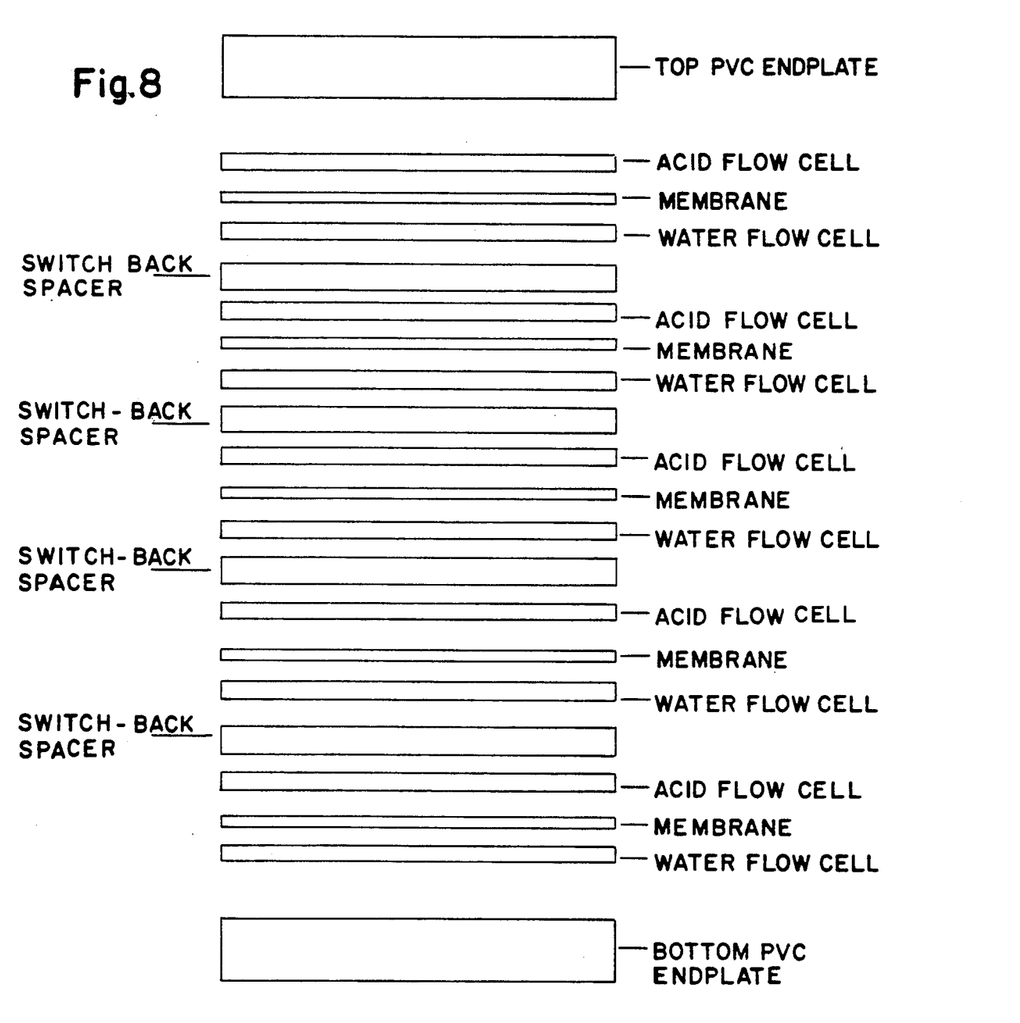
FIG. 8 shows a five-cell-pair.

Stack assembly begins with the manufacture of two stack end-plates (see FIGS. #6 and #7). If a Diffusion Dialysis stack is thought of as a sandwich, the end-plates are the bread and the flow cells are the dressings. These end-plates are made of Type 1 PVC and are of the same dimensions as the flow cells, with the thickness being 1.5". These end-plates provide for the means of plumbing the inlets and outlets of the stacked flow cells to external sources. The assembly that is illustrated in FIG. #8 (5 Cell-pair) is repeated to produce either a 25 Cell-pair membrane stack, or a 50 Cell-pair membrane stack.

Figure 9:
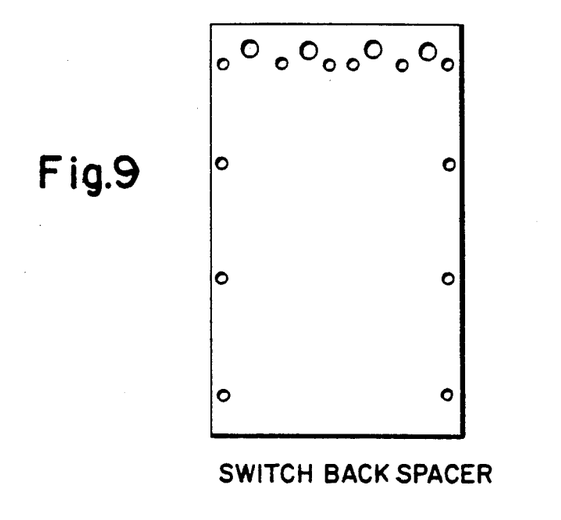
FIG. 9 shows a switch-back spacer.

Fundamental to the ability to achieve series countercurrent flow is the ability to switch flow directions within the stack. This is accomplished through use of the switch-back spacer (see FIG. #9). This design is symmetrical and allows the use of this spacer as a flow director for all flow orientations.

Component List

The following is a complete component list for the manufacture of a 25 Cell-pair Diffusion Dialysis stack of the series flow design:

| Qty | Material I.D. |
|---|---|
| 25 (6.25 m) | Anion Exchange Membranes |
| 100 | EVA Mixer/Support Screens |
| 25 | Water Flow Cells |
| 25 | Acid Flow Cells |
| 24 | Switch-back Spacers |
| 100 | Gasket Cores |
| 248 | Foam Gaskets |
| 2 | PVC Blocks-Machined |
| 8 | SS Channels |
| 12 ft | ¼" SS Threaded Rod |
| 16 | ¼" SS Nuts |
| 16 | ¼" SS Washers |
| 6 | ½" × close PVC Nipples |
| 2 | ½" × 3" PVC Nipples |
| 4 | ½" × 90 PVC Elbows TxT |
| 4 | ½" True Union Ball Valves |

The following is a complete component list for the manufacture of a 50 Cell-pair Diffusion Dialysis stack of the series flow design:

| Qty | Material I.D. |
| --- | --- |
| 75 (18.75 m) | Anion Exchange Membranes |
| 200 | EVA Mixer/Support Screens |
| 50 | Water Flow Cells |
| 50 | Acid Flow Cells |
| 24 | Switch-back Spacers |
| 200 | Gasket Cores |
| 448 | Foam Gaskets |
| 2 | PVC Blocks-Machined |
| 8 | SS Channels |
| 16 ft | ¼" SS Threaded Rod |
| 16 | ¼" SS Nuts |
| 16 | ¼" SS Washers |
| 6 | ¼" × close PVC Nipples |
| 2 | ¼" × 3" PVC Nipples |
| 4 | ¼" × 90 PVC Elbows TxT |
| 4 | ¼" True Union Ball Valves |

When manufacturing the 50 Cell-pair membrane stack the Switch-back spacer is positioned between every 2 Cell-pairs, as opposed to being positioned between every Cell-pair, as is the case in the 25 Cell-pair design.

Applied Diffusion Dialysis

Figure 10:
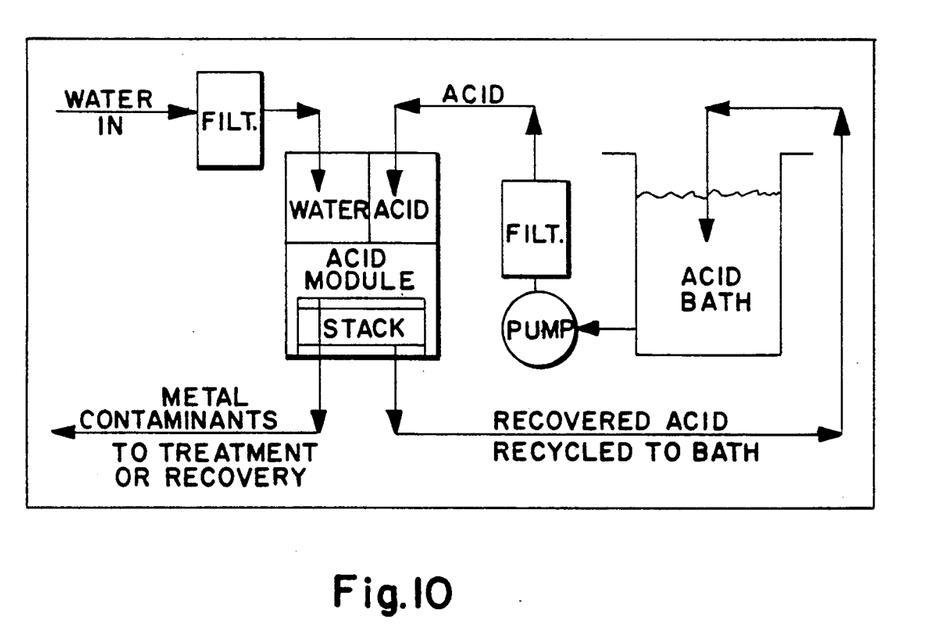
FIG. 10 shows an acid recycling flow diagram.
Figure 11:
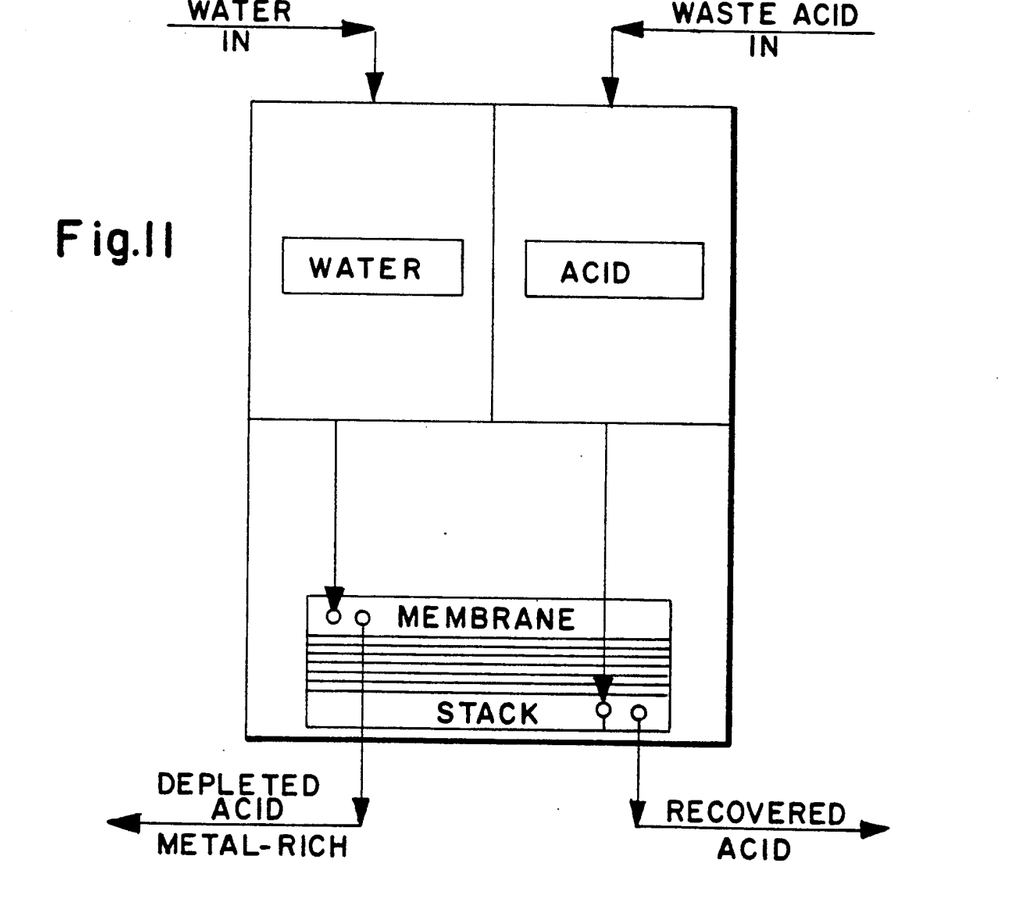
FIG. 11 show acid flowing by gravity down into a membrane stack.

FIG. #10, an Acid Recycling Flow Diagram, relates a typical acid recycling operating scenario. A magnetic drive pump located on the acid recycling module is plumbed to a working acid bath. This pump is controlled by a level switch within the acid holding tank on the module. Upon low level demand, the magnetic drive pump is activated which pumps acid from the operating bath into a holding tank located on the module. The acid then flows by gravity down into the membrane stack (see FIG. #11). A level control system also automatically supplies water to another holding tank located on the acid recycling module. This water also flows by gravity down into the membrane stack (see FIG. #11).

Once within the membrane stack the acid diffuses into the water with the majority of the metal contaminants being left behind. Thus two streams are produced from the acid recycling system: a purified, recovered acid which is metal-depleted; and, a metal-rich, depleted acid stream. The recovered acid is recycled back into the operating bath, and the metal-rich, depleted acid stream is directed to waste treatment, or to a recovery system, or to a volume reduction system.

In effect, the contaminant metals in the operating acid bath—the reason most acid baths are dumped!—are being selectively removed from the bath.

System Assembly

Once the membrane stack is fabricated it is positioned onto a 316 stainless steel frame which has been epoxy coated. Recesses in the top portion of this frame allows for the placement of two polypropylene solution holding tanks. These solution holding tanks are plumbed to the Diffusion Dialysis membrane stack, the acid tank being plumbed to the acid inlet port on the membrane stack, and the water tank being plumbed to the water inlet port on the membrane stack. A magnetic drive pump is secured to the base of the support frame, adjacent to the membrane stack. The inlet of this pump is plumbed to a source of acid solution that is to be dialyzed. The outlet of this magnetic drive pump is plumbed to the inlet of a filter housing which is also secured to the base of the support frame. The outlet of this filter housing is plumbed up and into the acid solution holding tank located on top of the frame. An adjustable level control switch located within the acid solution holding tank, automatically operates the magnetic drive pump. When a low level set point is reached within the acid solution holding tank a switch is activated in the level controller which turns the magnetic drive pump on which starts pumping acid solution through the previously mentioned filter and into the acid solution holding tank on the system. The magnetic drive pump will continue pumping the acid solution into the holding tank until a high level set-point is reached on the level controller. At this high level set-point another switch is tripped which turns off the magnetic drive pump.

The water holding tank is filled similarly via use of a level controller located in the water holding tank. This level controller activates a solenoid valve plumbed just prior to the water filter. This valve is typically plumbed to a pressurized source of water.

Once the water and acid solutions are in their respective solution holding tanks, these solutions flow by a combination of gravity and gravity assisting pumps down into the membrane stack. The gravity assisting pumps that are used are chemical metering pumps and the inlets of the metering pumps are plumbed to the outlet ports of the membrane stack. These gravity assisting metering pumps are a significant advancement over other diffusion dialysis systems that rely solely on solution movements via gravity. This is because the Diffusion Dialysis process often results in a significant level of off-gassing. This off-gassing is both a result of air entrapment in the solutions and chemical phasing within the membrane stack. Diffusion Dialysis systems that rely solely on gravity require special engineering compensations to purge the membrane stack of unwanted gas/air build-up. These systems usually require degassification treatment of the source acid and water solutions. Failure to compensate for the gassing and air entrapment problems will significantly affect the performance of the Diffusion Dialysis process. As the gas/air builds up within the flow cells of the stack, a resistance to solution flow develops which causes a decreased and decreasing flow rate. Since the key to proper Diffusion Dialysis performance is the control of the equilibrium exchange across the membrane, improper and variable solution flow rates will limit the controllability of the Diffusion Dialysis equilibrium.

Utilizing the chemical metering pumps on the outlets of the membrane stack enables the entrapped air and gas to be continuously, slowly siphoned off without detrimental air/gas buildup. Gravity provides a pushing effect on the solutions moving through the membrane stack, whereas the metering pumps provide a pulling effect and together there is no gas/air build-up and enhanced control with enhanced performance. The metering pumps have the added benefit of affording an exact control of the acid solution and water flow rates through the membrane stack. Solution flow rates can be fixed and held to within 0.1 mL per minute and flow rates can be adjusted up and down over a wide range while maintaining this controllability.

The following is a bill of materials list for an A-125 Acid Recycling System:

| Qty | Identification |
| --- | --- |
| 1 | Diffusion Dialysis Membrane Stack |
| 1 | Stainless Frame |
| 2 | Polypro Tanks |
| 2 | Metering Pumps |

-continued

| Qty | Identification |
|---|---|
| 1 | March 5.5 Pump |
| 1 | Acid Filter |
| 1 | Water Filter |
| 2 | Level Controls |
| 1 | Solenoid Valve |
|  | Misc. Plumbing |

Other, larger systems would contain these same components, in the same quantities except for the number of membrane stacks and except for the metering pumps which are a function of the number of membrane stacks.

SUMMARY

The Pure Cycle Environmental Technologies Diffusion Dialysis Acid Recycling System described above incorporates the following innovations:
Series counter-current flow within a membrane stack.
Series connection of parallel counter-current flow membrane stacks.
Use of chemical metering pumps for solution flow.
The specific best-mode design.
Alternative Incarnations All of the dimensions of this design are alterable, including the length, width, number of cell pairs, the cross-sectional flow cell area, and the shape of cross-sectional area. All of the dimensions of the individual components are similarly alterable. Series flow configurations may be achieved through the changing of the flow cell shape to produce a tortuous path configuration. A number of tortuous parallel flow cells could be linked in series, either internally or external to the membrane stack. Tubular designs can be construed, constructed and bundled to eliminate the stacking configuration.

Alternative materials of construction could be substituted for any or all of the components of this design. The list of alternative materials includes, but is not limited to, the following:
Acetals,
Acrylics,
Cellulosics,
Fluoroplastics,
Ketone based resins,
Nitriles,
Nylons,
Phenolics,
Polyamide-imides,
Polyarylates,
Polybenzimidazoles,
Polybutylenes,
Polycarbonates,
Polyesters,
Polybutylene terephthalates,
Polycyclohexylenedimethylene terephthalates,
Polyethylene terephthalates,
Polyetherimides,
Polyethylenes, including
  Ethylene Acid Copolmers,
  Ethylene-ethyl Acrylates
  Ethylene-methyl Acrylates,
  Ethylene-vinyl Acetates,
  Ethylene-vinyl Alcohol Copolymers,
  Ionomers,
  Variable Densities and/or Molecular Weights,
Polyimides,
Polymethylpentenes,
Polyphenylene oxides,
Polyphenylene sulfides,
Polyphthalamides,
Polypropylenes, including all polymers and copolymers,
Polyurethanes,
Silicones,
Styrenics, including
  ABS,
  ACS,
  Acrylic-styrene-acrylonitriles,
  Polystyrenes,
  Styrene-acrylonitriles (SAN),
  Olefin-modified SAN,
  Styrene-butadiene Copolymers,
  Styrene-maleic Anhydrides,
Sulfone-based Resins, including
  Polyarylsulfones,
  Polyethersulfones,
  Polysulfones,
Thermoplastic elastomers, including
  Styrenic Block Copolymers,
  Polyolefin Blends (TPOS),
  Elastomeric Alloys,
  Thermoplastic Polyurethanes (TPUS),
  Thermoplastic Copolyesters,
  Thermoplastic Polyamides,
Vinyl-based Resins, including
  Chlorinated Polyvinyl Chlorides (CPVC),
  Polyvinyl Chlorides (PVC),
  Vinylidene Chlorides (PVDC),
  Including all ancillary materials and materials.

| TYPICAL ACID RECOVERY SYSTEM PERFORMANCE | | | |
|---|---|---|---|
| Acid I.D. | Initial Acid | Recovered Acid | Depleted Acid |
| Hydrochloric Acid- (Chrome Rack Stripper): | | | |
| Acid Normality | 4.9 Normal | 4.3 Normal | 0.5 Normal |
| Chrome | 1030 ppm | 250 ppm | 860 ppm |
| Iron | 1960 ppm | 410 ppm | 1530 ppm |
| Nickel | 570 ppm | 130 ppm | 440 ppm |
| Hydrochloric Acid- (Zinc Galvinizer): | | | |
| Acid Normality | 2.7 Normal | 2.2 Normal | 0.15 Normal |
| Iron | 70,000 ppm | 10,000 ppm | 60,000 ppm |
| Hydrochloric Acid- (Electronics Plater): | | | |
| Acid Normality | 6.8 Normal | 5.8 Normal | 1.2 Normal |
| Chrome | 45 ppm | 9.4 ppm | 50 ppm |
| Cobalt | 3.2 ppm | 0.9 ppm | 3.2 ppm |
| Copper | 58 ppm | 41 ppm | 18 ppm |
| Iron | 380 ppm | 100 ppm | 240 ppm |
| Nickel | 58 ppm | 8.0 ppm | 75 ppm |
| Silver | 1.4 ppm | 1.2 ppm | 0.4 ppm |
| Zinc | 2.4 ppm | 1.2 ppm | 0.3 ppm |
| Nitric Acid- (Rack Stripper): | | | |
| Acid Normality | 6.2 Normal | 5.7 Normal | 0.51 Normal |
| Copper | 4000 ppm | 917 ppm | 3100 ppm |
| Iron | 350 ppm | 20 ppm | 320 ppm |
| Nickel | 35,000 ppm | 560 ppm | 34,500 ppm |
| Nitric Acid- (Rack Stripper): | | | |
| Acid Normality | 6.8 Normal | 6.2 Normal | 0.6 Normal |
| Copper | 92,000 ppm | 10,300 ppm | 81,000 ppm |
| Nitric-Hydrofluoric Acid- (Titanium Etchant): | | | |
| Acid Normality | 2.8 Normal | 2.4 Normal | 0.4 Normal |
| Nitric Acid | 1.6 Normal | 1.4 Normal | 0.2 Normal |
| Hydrofluoric Acid | 1.2 Nor- | 1.0 Nor- | 0.2 Nor- |

TYPICAL ACID RECOVERY SYSTEM PERFORMANCE

| Acid I.D. | Initial Acid | Recovered Acid | Depleted Acid |
|---|---|---|---|
| Titanium | 18,700 ppm | 4600 ppm | 13,400 ppm |
| Sulfuric Acid- (Nickel Plater): | | | |
| Acid Normality | 9.0 Normal | 7.2 Normal | 1.8 Normal |
| Nickel | 17,600 ppm | 1000 ppm | 16,300 ppm |
| Sulfuric Acid- (Zinc Galvanizer): | | | |
| Acid Normality | 0.75 Normal | 0.65 Normal | 0.10 Normal |
| Iron | 31,600 ppm | 2500 ppm | 24,900 ppm |
| Zinc | 31,000 ppm | 1200 ppm | 29,000 ppm |
| Phosphoric Acid- (Aluminum Bright Dip): | | | |
| Acid Normality | 10.0 Normal | 5.0 Normal | 5.0 Normal |
| Aluminum | 27,000 ppm | 320 ppm | 28,000 ppm |

I claim:

1. A system for removing acid from a metal-rich acid stream by diffusion dialysis, in which:
   (a) the acid stream is contacted with a water stream through an ion exchange membrane, in a series, counter current flow contactor,
   (b) the contactor is formed of a stack of layers of ion exchange membrane and impervious separators with flow-control apertures, and
   (c) the stack includes switch-back spacers which cause the flow to switch direction, without external plumbing said spacers having a first end and a second end, and having pass-through appertures at said first end and an apperture blocking zone at said second end, adapted to block flow through said second end.

* * * * *